(12) United States Patent
Chu

(10) Patent No.: US 12,333,973 B2
(45) Date of Patent: Jun. 17, 2025

(54) FLEXIBLE DISPLAY MODULE AND ELECTRONIC DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Liang Chu, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,206

(22) PCT Filed: Apr. 25, 2022

(86) PCT No.: PCT/CN2022/088941
§ 371 (c)(1),
(2) Date: Oct. 19, 2023

(87) PCT Pub. No.: WO2023/197372
PCT Pub. Date: Oct. 19, 2023

(65) Prior Publication Data
US 2024/0221561 A1    Jul. 4, 2024

(30) Foreign Application Priority Data
Apr. 13, 2022  (CN) .......................... 202210384825.2

(51) Int. Cl.
*G06F 1/16*  (2006.01)
*G09G 3/00*  (2006.01)

(52) U.S. Cl.
CPC ........... *G09G 3/035* (2020.08); *G06F 1/1652* (2013.01)

(58) Field of Classification Search
CPC ..... G09G 3/035; G06F 1/1637; G06F 1/1624; G06F 1/1652
See application file for complete search history.

(56) References Cited

U.S. PATENT DOCUMENTS 9,204,565 B1 * 12/2015 Lee ........................... E05D 7/00
10,474,196 B2 * 11/2019 Yeh ....................... G06F 1/1681
(Continued)

FOREIGN PATENT DOCUMENTS

| CN | 102902308 A | 1/2013 |
| CN | 205992384 U | 3/2017 |

(Continued)

OTHER PUBLICATIONS

Chinese Office Action issued in corresponding Chinese Patent Application No. 202210384825.2 dated Apr. 28, 2023, pp. 1-9.
(Continued)

*Primary Examiner* — Olga V Merkoulova
(74) *Attorney, Agent, or Firm* — PV IP PC; Wei Te Chung

(57) ABSTRACT

A flexible display module and an electronic device are provided in the present application; when a main display screen of the flexible display module is in a flattened state, a supporting member extends out of a supporting component, and the main display screen is located on the supporting component and the supporting member; when the main display screen is in a bent state, at least part of the supporting member is retracted into the supporting component. This way, displacement generated when a flexible display panel is bent is compensated by telescopic movement of a telescopic component, so as to alleviate a problem of gaps
(Continued)

generated in a frame when an existing folding display device is bent.

20 Claims, 2 Drawing Sheets

(56) References Cited

U.S. PATENT DOCUMENTS

| | | | | |
|---|---|---|---|---|
| 10,503,211 | B2* | 12/2019 | Yee | G06F 1/1652 |
| 10,845,850 | B1* | 11/2020 | Kang | G06F 1/1616 |
| 11,224,137 | B2* | 1/2022 | Hsu | E05D 3/18 |
| 11,266,033 | B2* | 3/2022 | Moon | H05K 5/0086 |
| 11,792,946 | B2* | 10/2023 | Park | H05K 5/0017 |
| | | | | 361/679.01 |
| 11,846,991 | B2* | 12/2023 | Feng | G06F 1/1637 |
| 2016/0180757 | A1* | 6/2016 | Um | G06F 1/1652 |
| | | | | 345/82 |
| 2019/0174645 | A1* | 6/2019 | Jeon | G06F 1/1681 |
| 2019/0274227 | A1* | 9/2019 | Hsu | H05K 5/0226 |
| 2021/0120688 | A1* | 4/2021 | Wang | G06F 1/1681 |
| 2021/0211530 | A1* | 7/2021 | Jung | G06F 1/1681 |
| 2021/0307186 | A1* | 9/2021 | Hong | H04M 1/0216 |
| 2021/0341972 | A1* | 11/2021 | Togashi | G06F 1/1652 |

FOREIGN PATENT DOCUMENTS

| | | |
|---|---|---|
| CN | 107437378 A | 12/2017 |
| CN | 107545849 A | 1/2018 |
| CN | 208806015 U | 4/2019 |
| CN | 110310571 A | 10/2019 |
| CN | 111179762 A | 5/2020 |
| CN | 112037654 A | 12/2020 |
| CN | 112509465 A | 3/2021 |
| CN | 112562519 A | 3/2021 |
| CN | 112837621 A | 5/2021 |
| CN | 113781910 A | 12/2021 |
| CN | 114170909 A | 3/2022 |
| CN | 114241913 A | 3/2022 |
| KR | 20210059090 A | 5/2021 |
| TW | M618597 U | 10/2021 |

OTHER PUBLICATIONS

International Search Report in International application No. PCT/CN2022/088941, mailed on Jan. 3, 2023.
Written Opinion of the International Search Authority in International application No. PCT/CN2022/088941, mailed on Jan. 3, 2023.

* cited by examiner

FLEXIBLE DISPLAY MODULE AND ELECTRONIC DEVICE

FIELD OF DISCLOSURE

The present application relates to a technical field of displays, and specifically to a flexible display module and an electronic device.

BACKGROUND OF DISCLOSURE

With technical development of displays, flexible displays are becoming increasingly popular. Since the flexible displays can realize folding display, a problem of being difficult to carry is solved. However, when a folding display device is folded, a radius of curvature of a folded part of a flexible display screen is close to a critical radius of curvature of the flexible display screen, or even less than the critical radius of curvature of the flexible display screen, causing the flexible display screen to generate a larger internal stress. In order to reduce the internal stress generated when the flexible display screen is bent, the flexible display screen can slide linearly to compensate for its deformation in a bending area. However, displacement compensation generated when the flexible display screen is bent will inevitably lead to a gap (gap) in a frame of the folding display device, which will affect subjective feeling and user experiences.

Technical Problem

A flexible display module and an electronic device are provided by the present application, so as to alleviate a technical problem of gaps generated in a frame when an existing folding display device is bent.

SUMMARY OF DISCLOSURE

In order to solve the above-mentioned problems, technical solutions provided by the present application are as follows:

A flexible display module is provided by an embodiment of the present application, which comprises:
  a supporting component;
  a flexible display panel comprising a main display screen, the main display screen located on the supporting component and having a bending area;
  a telescopic component located at an end of the supporting component away from the bending area, the telescopic component comprising a supporting member, and the supporting member being capable of telescopically moving relative to the supporting component;
  a controlling mechanism connected to the telescopic component, the controlling mechanism configured to control the telescopic component to telescopically move relative to the supporting component;
  wherein the main display screen comprises a flattened state and a bent state; when the main display screen is in the flattened state, the supporting member extends out of the supporting component, and the main display screen is located on the supporting component and the supporting member; when the main display screen is in the bent state, at least part of the supporting member is retracted into the supporting component.

In the flexible display module provided by the embodiment of the present application, when the main display screen is in the bent state, the supporting member is completely retracted into the supporting component, and the main display screen is located on the supporting component.

In the flexible display module provided by the embodiment of the present application, the telescopic component further comprises a decorating member vertically connected to the supporting member; an end of the main display screen away from the bending area faces the decorating member, and the decorating member is attached to the end of the main display screen away from the bending area.

In the flexible display module provided by the embodiment of the present application, the flexible display panel further comprises a secondary display screen connected to the supporting member; when the main display screen is in the bent state, part of the supporting member is retracted into the supporting component.

In the flexible display module provided by the embodiment of the present application, the telescopic component further comprises an elastic member located on the supporting member, the secondary display screen is connected to the supporting member through the elastic member.

In the flexible display module provided by the embodiment of the present application, the flexible display panel further comprises a secondary display screen located on the supporting member and connected to the controlling mechanism; when the main display screen is in the bent state, part of the supporting member is retracted into the supporting component.

In the flexible display module provided by the embodiment of the present application, the supporting member is provided with a groove, and the secondary display screen is disposed corresponding to the groove.

In the flexible display module provided by the embodiment of the present application, the telescopic component further comprises a decorating member vertically connected to the supporting member, and an end of the secondary display screen away from the bending area faces the decorating member; when the main display screen is in the bent state, the main display screen is parallel to and is connected to the secondary display screen, and the decorating member is attached to the end of the secondary display screen away from the bending area.

In the flexible display module provided by the embodiment of the present application, when the main display screen is in the flattened state, the secondary display screen is located at a side of the main display screen facing the supporting component; when the main display screen is in the bent state, the supporting component is wrapped by the main display screen, and an upper surface of the secondary display screen is flush with an upper surface of the main display screen.

In the flexible display module provided by the embodiment of the present application, when the main display screen is in the flattened state, the secondary display screen is located at a side of the main display screen facing the supporting component; when the main display screen is in the bent state, the main display screen is wrapped by the supporting component, and the secondary display screen is also located at the side of the main display screen facing the supporting component.

In the flexible display module provided by the embodiment of the present application, when the main display screen is in the flattened state, an upper surface of the secondary display screen is flush with an upper surface of the main display screen; when the main display screen is in the bent state, the supporting component is wrapped by the main display screen, and the upper surface of the secondary display screen is flush with the upper surface of the main display screen.

In the flexible display module provided by the embodiment of the present application, when the main display screen is in the flattened state, an upper surface of the secondary display screen is flush with an upper surface of the main display screen; when the main display screen is in the bent state, the main display screen is wrapped by the supporting component, and the secondary display screen is located at a side of the main display screen facing the supporting component.

In the flexible display module provided by the embodiment of the present application, the supporting component comprises a first supporting portion and a second supporting portion, and the first supporting portion and the second supporting portion are movably connected with each other in a corresponding bending area.

In the flexible display module provided by the embodiment of the present application, the controlling mechanism may be fixedly connected to the supporting component.

An electronic device is further provided in another embodiment of the present application, which comprises a shell and a flexible display module; the shell defines a receiving cavity, and the flexible display module is assembled in the receiving cavity, wherein the flexible display module comprises the flexible display module of one of the foregoing embodiments.

In the flexible display module provided by the present application, the flexible display module comprises a supporting component, a flexible display panel, a telescopic component, and a controlling mechanism; the flexible display panel comprises a main display screen, the main display screen is located on the supporting component and has a bending area. The telescopic component is located at an end of the supporting component away from the bending area, and the telescopic component comprises a supporting member, and the supporting member is capable of telescopically moving relative to the supporting component. The controlling mechanism is connected to the telescopic component, and the controlling mechanism is configured to control the telescopic component to telescopically move relative to the supporting component. The main display screen comprises a flattened state and a bent state; when the main display screen is in the flattened state, the supporting member extends out of the supporting component, and the main display screen is located on the supporting component and the supporting member; when the main display screen is in the bent state, at least part of the supporting member is retracted into the supporting component. In the present application, displacement of the main display screen is compensated by telescopic movement of the telescopic component, so as to avoid gaps generated by the displacement when the main display screen is bent, thereby solving a problem of gaps generated in a frame when an existing folding display device is bent. Meanwhile the telescopic component is disposed to make it not necessary to make the flexible display module set a larger frame to cooperate with the displacement of the main display screen, thereby realizing a narrow frame.

BRIEF DESCRIPTION OF DRAWINGS

In order to illustrate technical solutions in embodiments of the present application or in the prior art more clearly, accompanying drawings that need to be used in a description of the embodiments or in the prior art will be briefly introduced as follows. Obviously, the drawings in following description are only some embodiments of this disclosure. For those skilled in the art, other drawings can also be obtained according to the disclosed drawings without creative efforts.

DETAILED DESCRIPTION OF PREFERRED EMBODIMENTS

Figure 1:
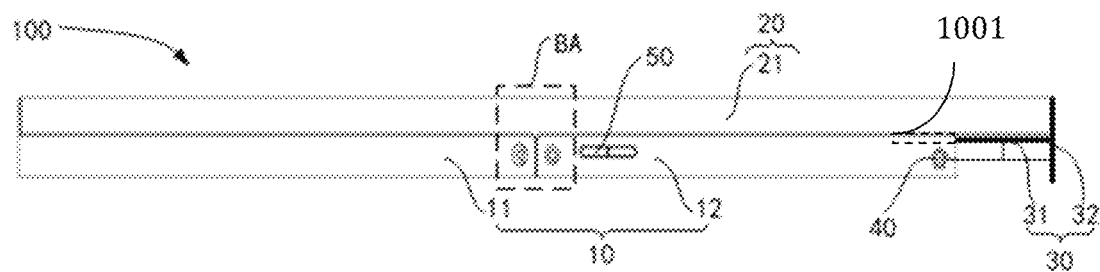
FIG. 1 is a schematic cross-sectional structural diagram of a flexible display module provided by an embodiment of the present application in a flattened state.

Following description of various embodiments refers to accompanying drawings to illustrate specific embodiments in which the present application may be practiced. Directional terms mentioned in the present application only refer to directions of the attached drawings, such as "upper", "lower", "front", "rear", "left", "right", "inner", "outer", "side", etc. Therefore, the directional terms used are used to describe and understand the present application, rather than to limit the present application. In drawings, units with similar structures are denoted by same reference labels. In the drawings, thicknesses of some layers and areas are exaggerated for clarity of understanding and ease of description. That is, size and thickness of each component shown in the drawings are arbitrarily shown, but the present application is not limited thereto.

Figure 2:
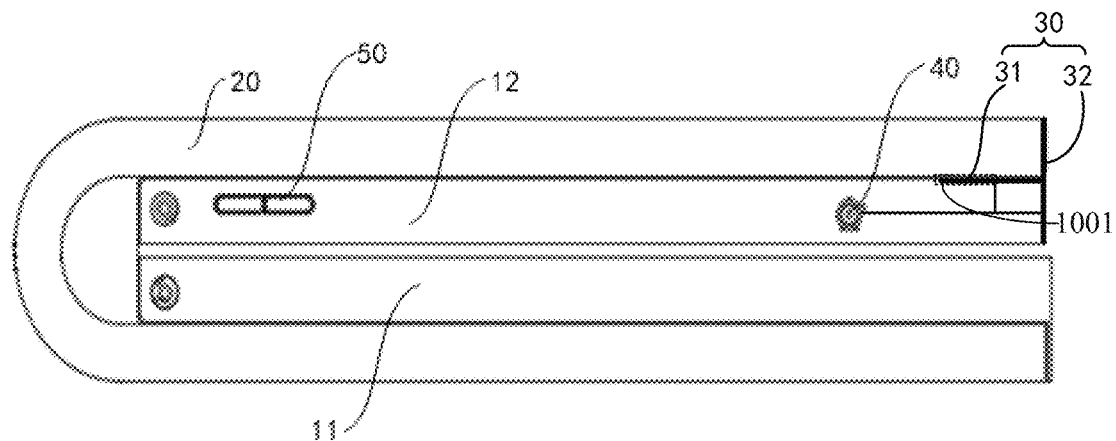
FIG. 2 is a schematic cross-sectional structural diagram of the flexible display module in FIG. 1 when it is bent.

Please refer to FIG. 1 and FIG. 2, FIG. 1 is a schematic cross-sectional structural diagram of a flexible display module provided by an embodiment of the present application in a flattened state; FIG. 2 is a schematic cross-sectional structural diagram of the flexible display module in FIG. 1 when it is bent. As shown FIGS. 1-7, the flexible display module 100 includes a supporting component 10 including a cavity 1001, a flexible display panel 20, a telescopic component 30, and a controlling mechanism 40. The flexible display panel 20 includes a main display screen 21, the main display screen 21 is located on the supporting component 10, and the main display screen 21 has at least a bending area BA. The main display screen 21 is capable of bending or folding in the bending area BA, so as to make the flexible display module 100 realize bending or folding, so that the flexible display module 100 occupies less space for easy portability.

Specifically, the main display screen 21 is located on the supporting component 10, and the main display screen 21 includes an organic light emitting display (OLED) panel, so the main display screen 21 can include a flexible substrate, and a driving circuit layer, a light-emitting functional layer, a package layer, and the like, which are all sequentially arranged in a stack on the flexible substrate. It can be understood that the main display screen 21 of the present application may include various functional structures of conventional OLEDs, which will not be repeated here.

Because the OLED panel has advantages of flexibility and wearability, the main display screen 21 can be bent, folded, or rolled, thereby realizing bendability, foldability, and rollability of the flexible display module 100.

The supporting component 10 is used to support the main display screen 21, so the main display screen 21 is located on the supporting component 10, which can be understood that the main display screen 21 is located at an upper surface of the supporting component 10, so as to realize a supporting function of the supporting component 10. Optionally, the supporting component 10 includes a first supporting portion 11 and a second supporting portion 12, and the first supporting portion 11 and the second supporting portion 12 are movably connected to each other in a corresponding bending area BA. Optionally, the first supporting portion 11 and the second supporting portion 12 are rotatably connected through hinges by arranging a rotating mechanism such as a hinge in the bending area BA. When the flexible display module 100 is used in an electronic device such as a mobile phone, the supporting component 10 can be a middle frame of the mobile phone.

The main display screen 21 comprises a flattened state and a bent state; when the supporting component 10 is located at a first position, the main display screen 21 is flattened; when the supporting component 10 is located at a second position, the main display screen 21 is bent in the corresponding bending area BA. Wherein the first position refers to that the supporting component 10 is in the flattened state, and at this time, the first supporting portion 11 and the second supporting portion 12 are in a same horizontal direction to jointly support the main display screen 21; the second position refers to that the supporting component 10 is bent along a bending direction of the bending area BA, that is to say, the first supporting portion 11 and the second supporting portion 12 rotate relative to each other, so as to realize bending or folding of the flexible display module 100. At this time, the main display screen 21 is also bent along the bending direction of the bending area BA along with the bending of the supporting component 10, so that the main display screen 21 is in the bent state. Moreover, the main display screen 21 will be deformed at a position of the bending area BA. In order to reduce deformation stress of the bending area BA, at least an end of the main display screen 21 will slide linearly relative to the supporting component 10 and generate displacement. The embodiment of the present application takes displacement of an end of the main display screen 21 corresponding to the second supporting portion 12 as an example to illustrate.

It can be understood that displacement generated by sliding of the main display screen 21 will cause a gap between the main display screen 21 and a frame, and pictures at the gap will not be displayed, which affects subjective feeling and user experiences.

To this end, in the embodiment of the present application, the telescopic component 30 is provided at an end of the supporting component 10 away from the bending area BA to compensate for the displacement of the main display screen 21 in the bent state. Wherein a length of supporting component 10 is less than a length of the main display screen 21 along a direction of the main display screen 21 generating the displacement; and a length difference between the main display screen 21 and the supporting component 10 is greater than or equal to the displacement generated by the main display screen 21 in the bent state, so that the telescopic component 30 will not be interfered by the supporting component 10 when the telescopic component 30 telescopically moves, so that the displacement of the main display screen 21 in the bent state can be completely compensated.

The telescopic component 30 comprises a supporting member 31, and the supporting member is capable of telescopically moving relative to the supporting component 10. Specifically, when the main display screen 21 is in the flattened state, the supporting member 31 extends out of the cavity 1001 of the supporting component 10, and the main display screen 21 is located on the supporting component 10 and the supporting member 31, as shown in FIG. 1. When the main display screen 21 is in the bent state, at least part of the supporting member 31 is retracted into the cavity 1001 of the supporting component 10, as shown in FIG. 2. Optionally, the supporting member 31 may be a plate formed of materials such as metal, plastic, and the like. When the main display screen 21 is in the flattened state, the supporting member 31 extends out of the supporting component 10 to support the main display screen 21 together with the supporting component 10.

Optionally, the supporting member 31 is movably connected to the controlling mechanism 40, and the controlling mechanism 40 is used to control the supporting member 31 of the telescopic component 30 to telescopically move relative to the supporting component 10. Optionally, the controlling mechanism 40 includes a power device such as a motor. The controlling mechanism 40 can be fixedly connected to the supporting component 10. The controlling mechanism 40 provides power to the telescopic component 30 and precisely controls displacement of the supporting member 31. Optionally, the flexible display module 100 further includes a switching component 50, and the switching component 50 is disposed on the supporting component 10. The switching component 50 is used to turn on or turn off controlling of the telescopic component 30 by the controlling mechanism 40.

Furthermore, the telescopic component 30 further includes a decorating member 32 vertically connected to the supporting member 31. An end of the main display screen 21 away from the bending area BA faces the decorating member 32. The decorating member 32 is attached to the end of the main display screen 21 away from the bending area BA. Orthographic projections of the main display screen 21 and the supporting component 10 on a plane where the decorating member 32 is located both fall within a range of the decorating member 32, so that the decorating member 32 can shield one lateral surface of the end of the main display screen 21 away from the bending area BA and one lateral surface of the end of the supporting component 10 away from the bending area BA; that is to say, the decorating member 32 is equivalent to a frame of the flexible display module 100 to protect the main display screen 21 and the supporting component 10.

Optionally, materials of the decorating member 32 and the supporting member 31 are same or different. For example, the decorating member 32 is also a plate or a shell formed of metal, plastic or other materials.

The decorating member 32 and the supporting member 31 move synchronously under an action of the controlling mechanism 40. Specifically, both the decorating member 32 and the supporting member 31 are movably connected to the controlling mechanism 40; for example, both the decorating member 32 and the supporting member 31 can be movably connected to the controlling mechanism 40 through bearings. The controlling mechanism 40 precisely controls relative sliding of the decorating member 32 relative to the main display screen 21 and controls relative sliding of the supporting member 31 relative to the supporting component 10 by controlling stroke of the bearings, so as to compensate for the displacement of the main display screen 21 when it is in the bent state.

The following will specifically describe how to compensate for displacement generated when the main display screen 21 is switched from the flattened state to the bent state:

As shown in FIG. 1, when the main display screen 21 is in the flattened state, the supporting member 31 extends out of the second supporting portion 12, and the main display screen 21 is located on the supporting component 10 and the supporting member 31; at this time, the supporting component 10 and the supporting member 31 support the main display screen 21 together. The decorating member 32 is located at the end of the main display screen 21 away from the bending area BA and attached to the end of the main display screen 21 away from the bending area BA; that is to say, when the main display screen 21 is in the flattened state, there are no gaps existing between the decorating member 32 and the main display screen 21.

When the main display screen 21 is bent along the bending direction of the bending area BA, a part of the main display screen 21 located on the second supporting portion 12 and the supporting member 31 will slide relative to the second supporting portion 12, making the main display screen 21 slide along a direction away from the decorating member 32. During a sliding process of the main display screen 21, the controlling mechanism 40 controls the supporting member 31 and the decorating member 32 to slide synchronously; specifically, the supporting member 31 slides along a direction toward the second supporting portion 12 to be retracted into the second supporting portion 12. At a same time, the decorating member 32 also slides along the direction toward the second supporting portion 12, so that sliding displacement of the main display screen 21 is compensated by sliding displacement of the supporting member 31 and the decorating member 32 to keep the decorating member 32 and the end of the main display screen 21 away from the bending area BA always attached to each other, so a schematic structural diagram of the main display screen 21 being bent is formed as shown in FIG. 2.

When the main display screen 21 is in the bent state, the supporting member 31 is totally retracted into the second supporting portion 12, and the decorating member 32 is still attached to the end of the main display screen 21 away from the bending area BA, so that there are still no gaps existing between the main display screen 21 and the decorating member 32. Therefore, a problem of gaps generated at the frame when the existing folding display device is bent is solved. At a same time, by setting the telescopic component 30, the flexible display module 100 does not need to be provided with a larger frame to cooperate with the displacement of the main display screen 21, so that a narrow frame can be realized.

When the main display screen 21 returns from the bent state to the flattened state, the controlling mechanism 40 controls the supporting member 31 and the decorating member 32 to slide along a direction away from the second supporting portion 12, so as to release displacement space of the main display screen 21. At this time, the main display screen 21 slides along a direction toward the decorating member 32 to form a schematic diagram of the main display screen 21 in the flattened state as shown in FIG. 1.

Figure 3:
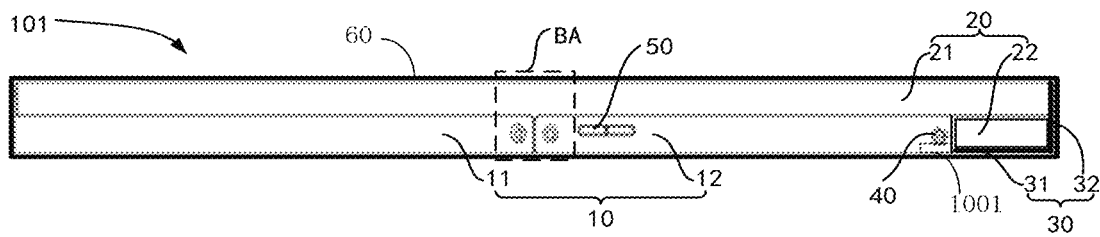
FIG. 3 is another schematic cross-sectional structural diagram of the flexible display module provided by the embodiment of the present application in the flattened state.
Figure 4:
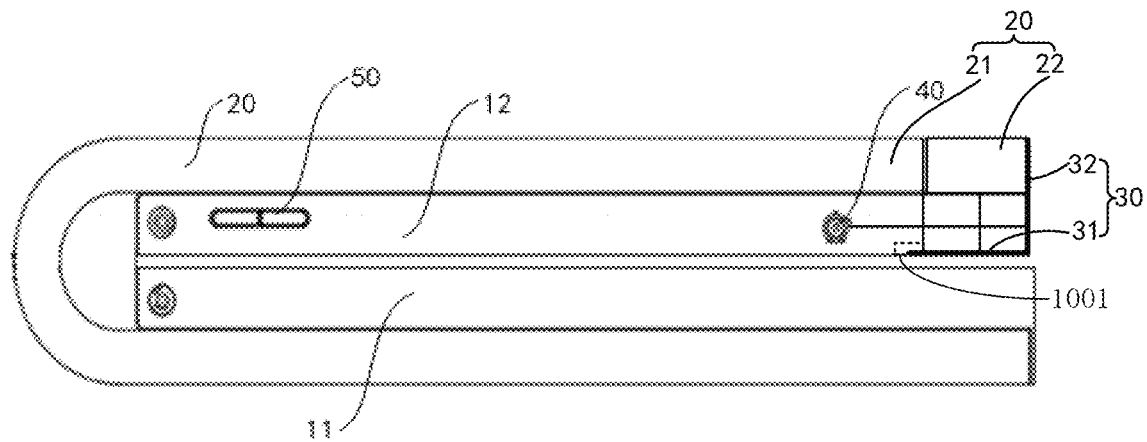
FIG. 4 is a schematic cross-sectional structural diagram of the flexible display module in FIG. 3 when it is bent.

In an embodiment, please refer to FIG. 3 and FIG. 4, FIG. 3 is another schematic cross-sectional structural diagram of the flexible display module provided by the embodiment of the present application in the flattened state. FIG. 4 is a schematic cross-sectional structural diagram of the flexible display module in FIG. 3 when it is bent. Different from the above-mentioned embodiment, the flexible display panel 20 of a flexible display module 101 further includes a secondary display screen 22 located on the supporting member 31 and connected to the controlling mechanism 40. An end of the secondary display screen 22 away from the bending area BA faces the decorating member 32; when the main display screen 21 is in the bent state, part of the supporting member 31 is retracted into the supporting component 10. The secondary display screen 22 can be movably connected to the controlling mechanism 40, and the controlling mechanism 40 is capable of controlling the secondary display screen 22 to rise, fall, move to left or move to right. In addition, the secondary display screen 22 is also linked with the telescopic component 30 under control of the controlling mechanism 40 to compensate for the displacement generated when the main display screen 21 is bent. Optionally, the secondary display screen 22 includes a display panel such as a liquid crystal display panel, an OLED display panel, and so on.

The following will specifically describe how the secondary display screen 22 and the telescopic component 30 compensate for the displacement generated when the main display screen 21 is switched from the flattened state to the bent state:

Specifically, as shown in FIG. 3, when the main display screen 21 is in the flattened state, the secondary display screen 22 is located between the supporting component 10 and the decorating member 32 and also located on the supporting member 31. At this time, the secondary display screen 22 is located between the supporting member 31 and the main display screen 21, the supporting member 31 supports the secondary display screen 22, and the secondary display screen 22 and the supporting component 10 support the main display screen 21 together. Both the supporting member 31 and the decorating member 32 are also connected to the controlling mechanism 40. Wherein the decorating member 32 is located at the end of the main display screen 21 away from the bending area BA and an end of the secondary display screen 22 away from the bending area BA; and the decorating member 32 is attached to the end of the main display screen 21 away from the bending area BA; that is to say, when the main display screen 21 is in the flattened state, there are no gaps existing between the decorating member 32 and the main display screen 21. Of course, optionally, the decorating member 32 can also be attached to the end of the secondary display screen 22 away from the bending area BA; however, a length of the secondary display screen 22 along a length direction of the supporting component 10 is less than a sliding displacement distance generated when the main display screen 21 is bent.

When the main display screen 21 is bent along the bending direction of the bending area BA, a part of the main display screen 21 located on the second supporting portion 12 and the secondary display screen 22 will slide relative to the second supporting portion 12, making the main display screen 21 slide along a direction away from the decorating member 32. After sliding of the main display screen 21 is completed, the controlling mechanism 40 controls the secondary display screen 22 to slide along a direction away from the supporting member 31, making the secondary display screen 22 and the main display screen 21 flush with each other and connect with each other to compensate for the displacement generated when the main display screen 21 is bent. Specifically, the controlling mechanism 40 controls the secondary display screen 22 to rise to a same plane as the main display screen 21, makes an end of the secondary display screen 22 close to the bending area BA attach to the end of the main display screen 21 away from the bending area BA, and makes an upper surface of the secondary display screen 22 flush with an upper surface of the main display screen 21.

At a same time, the controlling mechanism 40 also controls the telescopic component 30 to slide to fine-tune a distance between the decorating member 32 and the secondary display screen 22. Specifically, the controlling mechanism 40 controls the decorating member 32 to slide along a direction toward the secondary display screen 22, making the decorating member 32 attach to the end of the secondary display screen 22 away from the bending area BA; of course, as the decorating member 32 slides, the supporting member 31 also slides along the direction toward the second supporting portion 12, so that part of the supporting member 31 is retracted into the second supporting portion 12, forming a schematic structural diagram of the main display screen 21 after being bent as shown in FIG. 4.

As shown in FIG. 4, when the main display screen 21 is in the bent state, the supporting component is wrapped by the main display screen 21, so that the flexible display module 101 is folded outwardly. At this time, part of the supporting member 31 is retracted into the second supporting portion 12, and the secondary display screen 22 and the main display screen 21 are flush with each other and connected with each other, and the decorating member 32 is attached to the end of the secondary display screen 22 away from the bending area BA; this way, the displacement generated by the sliding of the main display screen 21 is compensated by cooperation of the secondary display screen 22 and the telescopic component 30. Therefore, the problem of gaps generated at the frame when the existing folding display device is bent is solved. At a same time, by setting the telescopic component 30 and the secondary display screen 22, the flexible display module 101 does not need to set a larger frame to cooperate with the displacement of the main display screen 21, thereby realizing a narrow frame.

When the main display screen 21 returns from the bent state to the flattened state, the controlling mechanism 40 controls the secondary display screen 22 to slide along a direction toward the supporting member 31 to a position above the supporting member 31; at a same time, the controlling mechanism 40 also controls the supporting member 31 and the decorating member 32 to slide a direction away from the second supporting portion 12 to release replacement space of the main display screen 21. At this time, the main display screen 21 slides along a direction toward the decorating member 32 to form a schematic diagram of the main display screen 21 in the flattened state as shown in FIG. 3. For other descriptions, please refer to the above-mentioned embodiments, which will not be repeated here.

It can be understood that in another embodiment, as a modification of the above-mentioned embodiment, the secondary display screen 22 can also be directly and fixedly connected to the supporting member 31, and the control mechanism 40 controls the supporting member 31 to slide, and the sliding of the supporting member 31 drives the secondary display screen 22 to slide. When the main display screen 21 is in the bent state, the supporting member 31 drives the secondary display screen 22 to rise to a position that is flush with and connected to the main display screen 21; at this time, the supporting member 31 can also play a role of supporting the secondary display screen 22.

Alternatively, the secondary display screen 22 can also be movably connected to the supporting member 31; for example, the telescopic component 30 further includes an elastic member (not shown) located on the supporting member 31, and the secondary display screen 22 is connected to the supporting member 31 through the elastic member. When the main display screen 21 is switched from the flattened state to the bent state, part of the supporting member 31 is retracted into the supporting component 10. The secondary display screen 22 pops up to a position flush with the main display screen 21 through the elastic member, and then the telescopic component 30 is controlled by the control mechanism 40 to slide, so as to fine-tune a distance between the main display screen 21, the secondary display screen 22, and the decorating member 32. When the main display screen 21 is switched from the bent state to the flattened state, the elastic member is retracted to pull back the secondary display screen 22.

Figure 5:
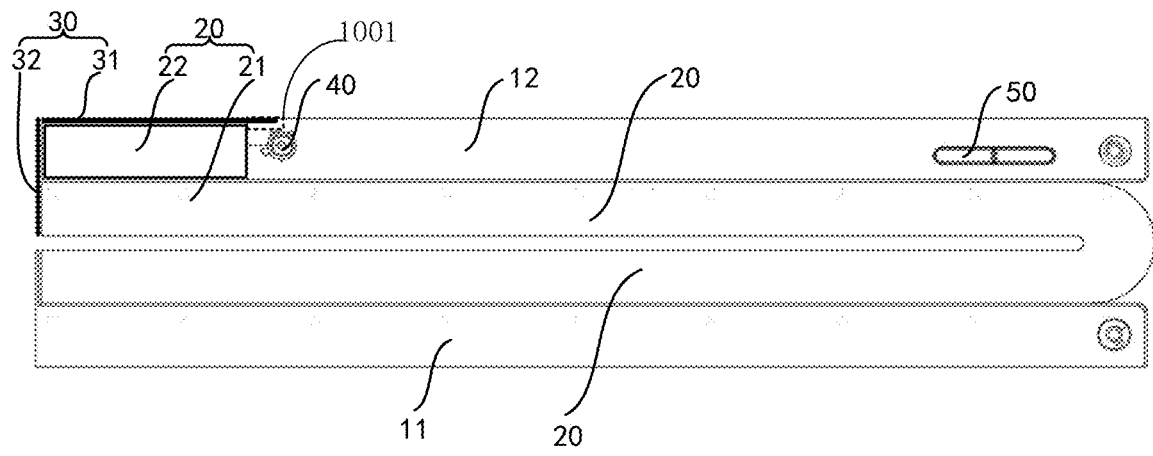
FIG. 5 is another schematic cross-sectional structural diagram of the flexible display module in FIG. 3 when it is bent.

In an embodiment, please refer to FIGS. 3 to 5 in combination, FIG. 5 is another schematic cross-sectional structural diagram of the flexible display module in FIG. 3 when it is bent. Different from the above-mentioned embodiment, the flexible display module 101 is folded inwardly. Specifically, when the main display screen 21 is in the flattened state, the secondary display screen 22 is located between the supporting component 10 and the decorating member 32, namely, the secondary display screen 22 is located at a side of the main display screen 21 facing the supporting component 10, and the secondary display screen 22 is also located at a side of the second supporting portion 12 facing the decorating member 32, as shown in FIG. 3. When the main display screen 21 is in the bent state, the main display screen 21 is wrapped by the supporting component 10 to realize folding inwardly of the flexible display module 101. At this time, the secondary display screen 22 is still located between the second supporting portion 12 and the decorating member 32, and the end of the secondary display screen 22 away from the bending area BA is flush with the end of the main display screen 21 away from the bending area BA, as shown in FIG. 5.

Specifically, when the main display screen 21 is switched from the flattened state to the bent state, an end of the main display screen 21 corresponding to the second supporting portion 12 will slide linearly and generate displacement. At this time, the controlling mechanism 40 controls the secondary display screen 22 to be linked with the telescopic component 30. Specifically, the secondary display screen 22 slides along the direction toward the second supporting portion 12, making the end of the secondary display screen 22 away from the bending area BA flush with the end of the main display screen 21 away from the bending area BA; part of the supporting member 31 of the telescopic component 30 is retracted into the second supporting portion 12, and the decorating member 32 moves synchronously toward the main display screen 21 and the secondary display screen 22, and the decorating member 32 is attached to the end of the main display screen 21 away from the bending area BA and the end of the secondary display screen 22 away from the bending area BA to compensate for the displacement generated by the sliding of the main display screen 21.

It can be understood that when the main display screen 21 is in the bent state, the secondary display screen 22 is located at a side of the main display screen 21 facing the second supporting portion 12, and the secondary display screen 22 is substantially flush with a lateral surface of the second supporting portion 12 away from the main display screen 21. The secondary display screen 22 can incorporate camera functions, weather, clock, and other functions therein to increase interest in the flexible display module 101. Of course, the supporting member 31 is further provided on a side of the secondary display screen 22 away from the main display screen 21, and in order to enable the secondary display screen 22 to display when the flexible display module 101 is folded inwardly, the supporting member 31 is provided with a groove at a position corresponding to the secondary display screen 22, and a display surface of the secondary display screen 22 is exposed on the groove. For other descriptions, please refer to the above-mentioned embodiments, which will not be repeated here.

Figure 6:
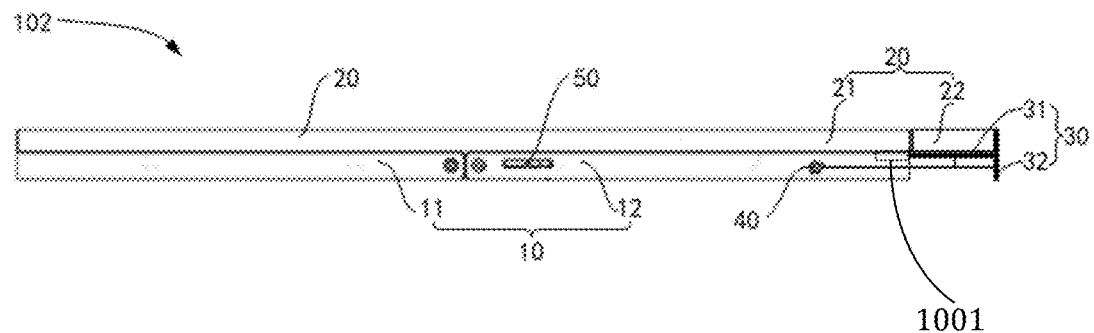
FIG. 6 is yet another schematic cross-sectional structural diagram of the flexible display module provided by the embodiment of the present application in the flattened state.
Figure 7:
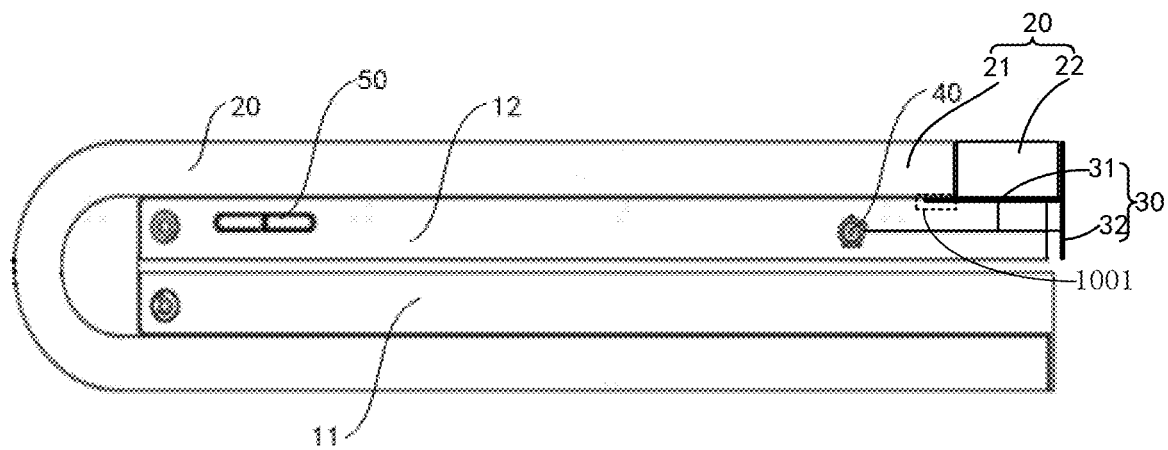
FIG. 7 is a schematic cross-sectional structural diagram of the flexible display module in FIG. 6 when it is bent.

In an embodiment, please refer to FIGS. 1 to 7 in combination, FIG. 6 is yet another schematic cross-sectional structural diagram of the flexible display module provided by the embodiment of the present application in the flattened state. FIG. 7 is a schematic cross-sectional structural diagram of the flexible display module in FIG. 6 when it is bent. Different from the above-mentioned embodiments, in a flexible display module 102 of this embodiment, when the main display screen 21 is in the flattened state, the secondary display screen 22 is located at the end of the main display screen 21 away from the bending area BA and is located between the main display screen 21 and the decorating member 32; and an upper surface of the secondary display screen 22 is flush with an upper surface of the main display screen 21, as shown in FIG. 6. When the main display screen 21 is in the bent state, the supporting component 10 is wrapped by the main display screen 21 to realize folding outwardly of the flexible display module 102; at this time, the secondary display screen 22 is still located at the end of the main display screen 21 away from the bending area BA and is located between the main display screen 21 and the decorating member 32; and the upper surface of the secondary display screen 22 is flush with the upper surface of the main display screen 21, making the secondary display screen 22 and the main display screen 21 flush with each other and connected with each other, as shown in FIG. 7.

Specifically, when the main display screen 21 is switched from the flattened state to the bent state, the end of the main display screen 21 corresponding to the second supporting portion 12 will slide linearly and generate displacement. At this time, the controlling mechanism 40 controls the secondary display screen 22 to be linked with the telescopic component 30, so that both the secondary display screen 22 and the telescopic component 30 both slide toward the main display screen 21; specifically, the secondary display screen 22 slides along a direction toward the main display screen 21, making the end of the secondary display screen 22 close to the bending area BA is connected to the end of the main display screen 21 away from the bending area BA; and the upper surface of the secondary display screen 22 is flush with the upper surface of the main display screen 21. Part of the supporting member 31 of the telescopic component 30 is retracted into the second supporting portion 12; the decorating member 32 slides synchronously along the direction toward the secondary display screen 22 and is attached to the end of the secondary display screen 22 away from the bending area BA to compensate for the displacement generated by the main display screen 21. For other descriptions, please refer to the above-mentioned embodiments, which will not be repeated here.

It can be understood that in another embodiment, please refer to FIG. 6 and FIG. 5 in combination, different from the above-mentioned embodiment, the flexible display module 102 shown in FIG. 6 can also be folded inwardly, and after folding inwardly, a schematic structural diagram of the main display screen 21 in the bent state shown in FIG. 5 is formed. Specifically, when the main display screen 21 is switched from the flattened state to the bent state, an end of the main display screen 21 corresponding to the second supporting portion 12 will slide linearly and generate displacement. At this time, the controlling mechanism 40 controls the secondary display screen 22 to move downwardly, so as to slide to the side of the main display screen 21 facing the second supporting portion 12, making the end of the secondary display screen 22 away from the bending area flush with the end of the main display screen 21 away from the bending area, so that when the flexible display module 102 is folded inwardly, the secondary display screen 22 can also be used for displaying. At a same time, the controlling mechanism 40 also controls the telescopic component 30 to slide along the direction toward the main display screen 21; specifically, the supporting member 31 moves downwaardly with the secondary display screen 22 and slides along the direction toward the second supporting portion 12 to be partially retracted into the second supporting portion 12; the decorating member 32 slides along the direction toward the secondary display screen 22, making the decorating member 32 attach to the end of the secondary display screen 22 away from the bending area and the end of the main display screen 21 away from the bending area to compensate for the displacement generated when the main display screen 21 slides. For other descriptions, please refer to the above-mentioned embodiments, which will not be repeated here.

In an embodiment, an electronic device is further provided by the embodiment of the present application, which includes a shell 60 and a flexible display module 100, for example as shown in FIG. 3. The shell defines a receiving cavity, and the flexible display module is assembled in the receiving cavity. The flexible display module includes one of the flexible display module in the foregoing embodiments. The electronic device includes electronic products such as mobile phones, televisions, tablets, and so on.

According to the above-mentioned embodiments, it can be known that:

The flexible display module and the electronic device are provided in the present application; the flexible display module includes the supporting component, the flexible display panel, the telescopic component, and the controlling mechanism. The flexible display panel includes the main display screen located on the supporting component and having a bending area. The telescopic component is located at the end of the supporting component away from the bending area, and the telescopic component comprises a supporting member capable of telescopically moving relative to the supporting component. The controlling mechanism is connected to the telescopic component, and the controlling mechanism is used to control the telescopic component to telescopically move relative to the supporting component. The main display screen comprises the flattened state and the bent state; when the main display screen is in the flattened state, the supporting member extends out of the supporting component, and the main display screen is located on the supporting component and the supporting member; when the main display screen is in the bent state, at least part of the supporting member is retracted into the supporting component. In the present application, the displacement of the main display screen is compensated by telescopic movement of the telescopic component, so as to prevent gaps generated by the displacement when the main display screen is bent, thereby solving the problem of gaps generated in the frame when the existing folding display device is bent. Meanwhile, the telescopic component is disposed, so that it is not necessary for the flexible display module to set a larger frame to cooperate with the displacement of the main display screen, thereby realizing a narrow frame.

In the above-mentioned embodiments, the description of each embodiment has its own emphasis. For parts that are not described in detail in a certain embodiment, reference may be made to the relevant descriptions of other embodiments.

The embodiments of the present application are described in detail above, and specific examples are used to illustrate the principles and implementations of the present application. The descriptions of the above-mentioned embodiments are only used to help understand technical solutions and core ideas of the present application; those of ordinary skill in the art should understand that: they can still modify the technical solutions described in the foregoing embodiments, or perform equivalent replacements to some of the technical features; however, these modifications or replacements do not make essence of the corresponding technical solutions deviate from a scope of the technical solutions of the embodiments of the present application.

What is claimed is:

1. A flexible display module, comprising:
a supporting component comprising a cavity;
a flexible display panel comprising a main display screen, the main display screen located on the supporting component and having a bending area, wherein a length of the supporting component is less than a length of the main display screen, and an end of the supporting component along a lengthwise direction of the supporting component is flush with an end of the main display screen along a lengthwise direction of the main display screen;
a telescopic component located at another end of the supporting component away from the bending area and unflush with the main display screen, the telescopic component comprising a supporting member, and the supporting member being capable of telescopically moving out of and retracted into the cavity of the supporting component;
a controlling mechanism connected to the telescopic component, the controlling mechanism configured to control the telescopic component to telescopically move relative to the supporting component;
wherein the main display screen comprises a flattened state and a bent state; when the main display screen is in the flattened state, the supporting member extends out of the cavity of the supporting component, and the main display screen is supported by the supporting component and the supporting member; when the main display screen is in the bent state, at least part of the supporting member is retracted into the cavity of the supporting component.

2. The flexible display module as claimed in claim 1, wherein when the main display screen is in the bent state, the supporting member is completely retracted into the supporting component, and the main display screen is located on the supporting component.

3. The flexible display module as claimed in claim 2, wherein the telescopic component further comprises a decorating member vertically connected to the supporting member; and the decorating member is attached to an end of the main display screen away from the bending area, the decorating member shields another end of the main display screen along the lengthwise direction of the main display screen, and the another end of the supporting component.

4. The flexible display module as claimed in claim 1, wherein the flexible display panel further comprises a secondary display screen connected to the supporting member; when the main display screen is in the bent state, part of the supporting member is retracted into the supporting component.

5. The flexible display module as claimed in claim 4, wherein the telescopic component further comprises an elastic member located on the supporting member, the secondary display screen is connected to the supporting member through the elastic member.

6. The flexible display module as claimed in claim 1, wherein the flexible display panel further comprises a secondary display screen located on the supporting member and connected to the controlling mechanism; when the main display screen is in the bent state, part of the supporting member is retracted into the supporting component.

7. The flexible display module as claimed in claim 6, wherein the supporting member is provided with a groove, and the secondary display screen is disposed corresponding to the groove.

8. The flexible display module as claimed in claim 6, wherein the telescopic component further comprises a decorating member vertically connected to the supporting member, and an end of the secondary display screen away from the bending area faces the decorating member; when the main display screen is in the bent state, the main display screen is parallel to and is connected to the secondary display screen, and the decorating member is attached to the end of the secondary display screen away from the bending area.

9. The flexible display module as claimed in claim 8, wherein when the main display screen is in the flattened state, the secondary display screen is located at a side of the main display screen facing the supporting component; when the main display screen is in the bent state, the supporting component is wrapped by the main display screen, and an upper surface of the secondary display screen is flush with an upper surface of the main display screen.

10. The flexible display module as claimed in claim 8, wherein when the main display screen is in the flattened state, the secondary display screen is located at a side of the main display screen facing the supporting component; when the main display screen is in the bent state, the main display screen is wrapped by the supporting component, and the secondary display screen is also located at the side of the main display screen facing the supporting component.

11. The flexible display module as claimed in claim 8, wherein when the main display screen is in the flattened state, an upper surface of the secondary display screen is flush with an upper surface of the main display screen; when the main display screen is in the bent state, the supporting component is wrapped by the main display screen, and the upper surface of the secondary display screen is flush with the upper surface of the main display screen.

12. The flexible display module as claimed in claim 8, wherein when the main display screen is in the flattened state, an upper surface of the secondary display screen is flush with an upper surface of the main display screen; when the main display screen is in the bent state, the main display screen is wrapped by the supporting component, and the secondary display screen is located at a side of the main display screen facing the supporting component.

13. The flexible display module as claimed in claim 1, wherein the supporting component comprises a first supporting portion and a second supporting portion, and the first supporting portion and the second supporting portion are movably connected with each other in a corresponding bending area.

14. The flexible display module as claimed in claim 1, wherein the controlling mechanism may be fixedly connected to the supporting component.

15. An electronic device, comprising a shell and a flexible display module, the shell defining a receiving cavity, and the flexible display module assembled in the receiving cavity, wherein the flexible display module comprises:
   a supporting component comprising a cavity;
   a flexible display panel comprising a main display screen, the main display screen located on the supporting component and having a bending area, wherein a length of the supporting component is less than a length of the main display screen, and an end of the supporting component along a lengthwise direction of the supporting component is flush with an end of the main display screen along a lengthwise direction of the main display screen;
   a telescopic component located at another end of the supporting component away from the bending area and unflush with the main display screen, the telescopic component comprising a supporting member, and the supporting member being capable of telescopically moving out of and retracted into the cavity of the supporting component;
   a controlling mechanism connected to the telescopic component, the controlling mechanism configured to control the telescopic component to telescopically move relative to the supporting component;
   wherein the main display screen comprises a flattened state and a bent state; when the main display screen is in the flattened state, the supporting member extends out of the cavity of the supporting component, and the main display screen is supported by the supporting component and the supporting member; when the main display screen is in the bent state, at least part of the supporting member is retracted into the cavity of the supporting component.

16. The electronic device as claimed in claim 15, wherein when the main display screen is in the bent state, the supporting member is completely retracted into the supporting component, and the main display screen is located on the supporting component.

17. The electronic device as claimed in claim 16, wherein the telescopic component further comprises a decorating member vertically connected to the supporting member; and the decorating member is attached to an end of the main display screen away from the bending area, the decorating member shields another end of the main display screen along the lengthwise direction of the main display screen, and the another end of the supporting component.

18. The electronic device as claimed in claim 15, wherein the flexible display panel further comprises a secondary display screen connected to the supporting member; when the main display screen is in the bent state, part of the supporting member is retracted into the supporting component.

19. The electronic device as claimed in claim 15, wherein the flexible display panel further comprises a secondary display screen located on the supporting member and connected to the controlling mechanism; when the main display screen is in the bent state, part of the supporting member is retracted into the supporting component.

20. The electronic device as claimed in claim 19, wherein the telescopic component further comprises a decorating member vertically connected to the supporting member, and an end of the secondary display screen away from the bending area faces the decorating member; when the main display screen is in the bent state, the main display screen is parallel to and is connected to the secondary display screen, and the decorating member is attached to the end of the secondary display screen away from the bending area.

* * * * *